US008630900B2

(12) United States Patent　　(10) Patent No.:　　US 8,630,900 B2
Pelen　　(45) Date of Patent:　　Jan. 14, 2014

(54) METHOD FOR PLAYING A SEQUENCE OF ADVERTISEMENTS AS WAITING MESSAGE, AND CALL CENTRE SYSTEM

(75) Inventor: François Pelen, Paris (FR)

(73) Assignee: PMT (FR)

( * ) Notice: Subject to any disclaimer, the term of this patent is extended or adjusted under 35 U.S.C. 154(b) by 654 days.

(21) Appl. No.: 12/953,950

(22) Filed: Nov. 24, 2010

(65) Prior Publication Data

US 2012/0128137 A1　May 24, 2012

(51) Int. Cl.
*G06Q 30/00*　(2012.01)
*H04M 11/00*　(2006.01)

(52) U.S. Cl.
USPC ..................................... 705/14.55; 379/88.13

(58) Field of Classification Search
USPC ................ 379/67.1, 88.25; 455/412.1, 414.1; 705/14.4
See application file for complete search history.

(56) References Cited

U.S. PATENT DOCUMENTS

| | | | | |
|---|---|---|---|---|
| 5,848,129 A * | 12/1998 | Baker | ........................... | 379/67.1 |
| 6,400,804 B1 * | 6/2002 | Bilder | ............................. | 379/76 |
| 6,513,016 B1 * | 1/2003 | Freeny, Jr. | ..................... | 705/26.8 |
| 6,898,571 B1 * | 5/2005 | Val et al. | ..................... | 705/14.39 |
| 7,130,392 B2 * | 10/2006 | Morton | ......................... | 379/88.25 |
| 7,738,645 B2 * | 6/2010 | Kim | .......................... | 379/215.01 |
| 2003/0119447 A1 * | 6/2003 | Fisher et al. | ..................... | 455/41 |
| 2006/0100928 A1 * | 5/2006 | Walczak et al. | ................. | 705/14 |
| 2008/0010129 A1 * | 1/2008 | Maggio | ............................ | 705/14 |
| 2008/0254881 A1 * | 10/2008 | Lutnick et al. | .................. | 463/31 |
| 2010/0014648 A1 * | 1/2010 | Baglio et al. | ............... | 379/88.13 |
| 2011/0071910 A1 * | 3/2011 | Dresden | ..................... | 705/14.73 |

* cited by examiner

*Primary Examiner* — Mohammad Islam
(74) *Attorney, Agent, or Firm* — Lerner, David, Littenberg, Krumholz & Mentlik, LLP (57) ABSTRACT

A method for playing a sequence of advertisements as a waiting message of at least one private automatic branch exchange ("PABX") is disclosed. A template sequence message may be created at the advertisement management server. The template sequence message may comprise a plurality of successive slots, each slot being able to receive an advertisement. The template sequence message and the advertisements may be sent to the PABX. For each incoming call received by the PABX and placed on hold by the PABX, the advertisements may be organized in a random order so as to allocate to each advertisement a rank, the successive advertisements may be inserted respectively in the successive slots of the template sequence message according to rank, and the completed template sequence message in which the advertisements have been inserted may be played by an audio player software of the PABX while the incoming call is on hold.

12 Claims, 5 Drawing Sheets

METHOD FOR PLAYING A SEQUENCE OF ADVERTISEMENTS AS WAITING MESSAGE, AND CALL CENTRE SYSTEM

FIELD OF THE INVENTION

The invention concerns systems implementing On-Hold messaging such as call centre systems.

More precisely, the invention relates to a method for playing a sequence of advertisements as waiting message of a private automatic branch exchange.

BACKGROUND OF THE INVENTION

Lots of companies, including for example telephone providers, internet providers, stores, public organisms, etc. dispose of telephonic hotlines. These hotlines enable the users to ask for support, information, and various services.

These hotlines are operated in dedicated places named call centres, can be a dedicated service of a company or a dedicated entity large enough to receive simultaneously thousands of calls (Some hotlines receive more than 120 millions calls a year). However, when a user calls, after having chosen the service he wants to reach, he often has to wait a few minutes: it may be up to an interlocutor could take his call, or up to his call could be transferred to another interlocutor if needed, or by the time the interlocutor works on his case, etc.

Indeed, most of call centres are PABX-based (Private Automatic Branch eXchange, i.e. a telephone switch which directs telephone calls). When a user dials the hotline telephone number, his call reaches the (or one of the) PABX of the call centre. At this point, if an interlocutor is available, the PABX directs the call towards this interlocutor, else the calling user is queued and put on hold as already explained.

During this waiting time, whose average length can be estimated to 3-4 minutes, music is generally played to entertain the user, this music being possibly punctuated by standard messages announcing for example that an interlocutor will respond soon. This is actually one or more recorded audio file: a PABX can store and play in a loop mp3 files, the users being connected to these audio files when put on standby. Alternatively, some PABX can listen to an external audio flow and play it, thus some hotlines continuously transmit the radio or a CD, or audio flows corresponding to advertisements about products of the company owning the hotline. A PABX may even be completed by a "Music On Hold" server, an equipment which delivers an audio flow to the PABX from various sources, including streaming via internet.

So millions of hours are wasted every year while waiting for a hotline to respond.

It could be interesting to play, during this waiting time, advertisements of the type of those which can be heard at radio. These radio advertisements are in the form of 15-30 seconds commercials, played at moments of the day chosen by the announcers.

However, as the waiting time of a telephonic hotline does not exceed a few minutes, the number of advertisements which can effectively be played to a user is relatively low. Moreover, as soon as the hotline is available, the on hold mode is stopped, and the currently played advertisement is cut: the advertisements shall not increase the waiting time.

To attract the announcers the five following objectives should be met:
the advertisements shall not be caught in the middle,
their frequency of apparition shall be controlled,
the set of advertisements shall regularly change
the advertisement shall touch an individual rather than a group (e.g. radio).
The announcer shall be able to interact with the calling user through promotional announces Yet, as already explained, a PABX is only able to continuously play an audio flux, and not to adapt it specifically to every user. So a PABX is not suitable as such for playing advertisements.

There is a need for a method enabling to play a sequence of advertisements as waiting message of a private automatic branch exchange. In particular, the invention aims at meeting the three objectives mentioned above.

SUMMARY OF THE INVENTION

The present invention proposes in a first aspect a method for playing a sequence of advertisements as waiting message of an at least one private automatic branch exchange (PABX)
said PABX being connected to a telephonic network and being able to receive incoming calls from said telephonic network and to put them on hold,
the PABX being connected to an advertisement management server,
a set of advertisements being stored into the advertisement management server,
each advertisement being a recorded audio message,
characterized in that said method comprises the steps of:
(a) creating a template sequence message at the advertisement management server,
said template sequence message comprising a plurality of successive slots,
each slot being able to receive an advertisement;
(b) sending the template sequence message and the set of advertisements to the PABX;
(c) for each incoming call received by the PABX and placed on hold by the PABX, performing the steps of:
(c1) organizing the set of advertisements in a random order so as to allocate to each advertisement a rank in said order;
(c2) inserting the successive advertisements respectively in the successive slots of the template sequence message, according to their rank in order;
(c3) playing the completed template sequence message in which the advertisements have been inserted, with an audio player software of the PABX server as long as the incoming call is on hold.

Preferred but non limiting features of the present invention are as follow:
the at least one PABX is completed by a local "music on hold" server,
the advertisement management server (20) being connected to the PABX through said MOH server,
the MOH server being adapted to:
receive the template sequence message and the set of advertisements at step (b),
perform the steps (c1) and (c2), and
provide with the completed template sequence message as an audio flux the PABX for playing it at step (c3);
the at least one PABX is provided with an improved audio player software, the improved audio player software being the audio player software adapted to:
receive the template sequence message and the set of advertisements at step (b),
perform the steps (c1) and (c2), and
directly play the completed template sequence message at step (c3);

the set of advertisements may comprises several times the same advertisement, the organizing of step (c1) being performed so that two identical advertisements are not directly following in order;

the step (c1) consists in organizing the set of advertisements in a random order so as to allocate to each advertisement a rank in said order, checking whether there is at least one succession of two identical advertisements, and performing again the step if so;

a list of advertisements to not play is provided for the at least one PABX, only the advertisements of the set which do not belong to said list being used at step (c);

at least one advertisement is provided with a playing time slot, the advertisement being sent at step (b) only during its playing time slot;

The method comprises a further step (c4) of sending back to the advertisement management server a set of statistical data including a list of advertisements completely played during the step (c3) and/or a on hold duration value;

the set of advertisements comprises at least one interactive advertisement, the step (c3) comprising a substep (c3') of sending a notification to a remote server associated with the interactive advertisement if a given number is dialled by the user performing the incoming call when the interactive advertisement is played;

the notification comprises the telephone number of the user performing the incoming call;

a subset of the set of advertisements is selected before performing the step (c1), the subset being adapted to the user performing the incoming call.

The present invention proposes in a second aspect of the invention a call centre system, comprising at least one private automatic branch exchange (PABX) connected to a telephonic network and able to receive incoming calls from said telephonic network, the PABX being connected to an advertisement management server, characterized in that it implements a method according to the first aspect of the invention.

BRIEF DESCRIPTION OF THE DRAWINGS

The above, and other objects, features and advantages of this invention, will be apparent in the following detailed description of which is to be read in connection with the accompanying drawings wherein.

DETAILED DESCRIPTION OF THE INVENTION

Figure 1:
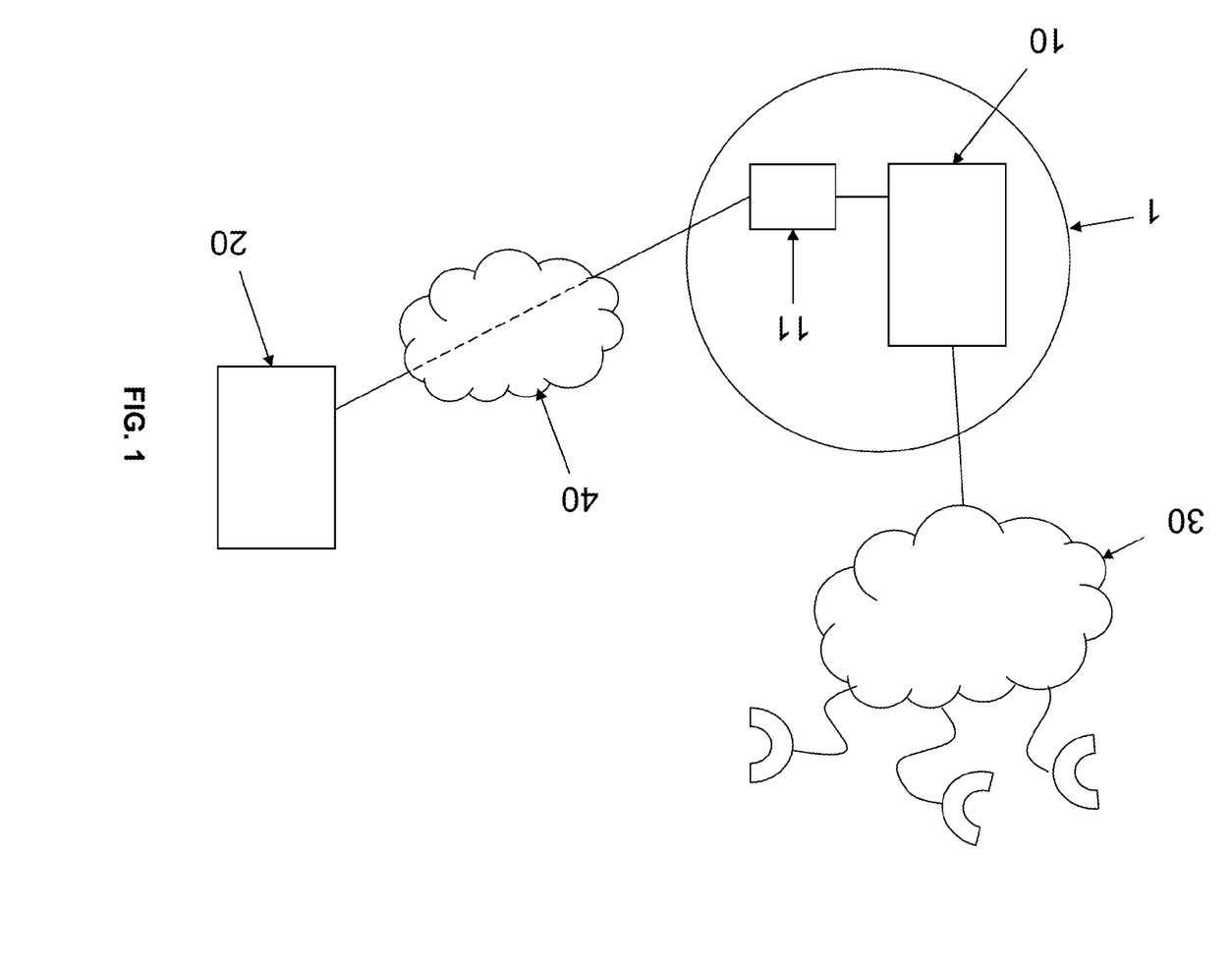
FIG. 1 represents a first embodiment of a call centre system according to an aspect of the invention.

The method for playing a sequence of advertisements as waiting message according to the invention is implemented by at least one private automatic branch exchange (PABX) 10, as represented by FIG. 1.

The PABX 10, for example located in a call centre 1, is connected to a telephonic network 30. This telephonic network may be a classical telephonic network (PSTN, i.e. Public Switched Telephonic Network), or alternatively a IP-based network (VoIP, i.e., Voice over Internet Protocol). In this second case, specifics PABX called IP-PABX may be used. As already explained, a PABX 10 (or an IP-PABX) is able to receive incoming calls from the telephonic network 30 and to put them on hold if needed.

The PABX 10 being connected to an advertisement management server 20. This server 20 may be located far from the PABX 10, for example in a datacenter. They are advantageously linked through the internet network 40. The advertisement management server 20 acts as an on-line advertising authority: the server 20 stores a set A of advertisements A1, A2, etc., each one of these advertisement having been provided by an announcer which wants its advertisement to be broadcast on one of more selected hotlines. For example, a company of videogames should be interested in hotlines of internet providers, as calling users have a computer. Each advertisement of the set A is a recorded audio message. The invention is not limited to any type of equipment for the advertisement management server 20.

From the set A of advertisements stored in the server 20, a plurality of waiting messages playable by the PABX 10 shall be built to avoid the overbroadcasting of some advertisements with respect to the others. However, as explained, a PABX 10 is only able to listen to an audio flow and play it as waiting message to an on-hold user. The method according to this invention provides a new waiting message for each new calling user.

Building of the Advertising Waiting Message

In a first step, a template sequence message S is created at the advertisement management server 20. This template sequence message S is an audio file, advantageously a mp3 file, comprising a plurality of successive slots S1, S2, etc.: each slot is able to receive an advertisement A1, A2, . . . .

Advantageously, the length of each advertisement is calibrated (for example they have a given length of 15 seconds). In this case, the slots S1, S2, etc., are blanks having the given length.

Moreover, the template sequence message S may comprise additional audio messages between slots. These additional audio messages are for example standard hotline messages (remaining waiting time, message about the Hotline owner, "Thank you for waiting, your call will be taken in a little while" . . . ).

The template sequence message S and the set A of advertisements are then sent to the PABX 10, the set A being advantageously checked by the company owning the hotline using the PABX 10, as the company may refuse some advertisements according to its policy, particularly the advertisements of its competitors. This step of sending the set A and the template sequence message is regularly performed, for example once a day, to update the template sequence message S and the set A of advertisements.

Besides, one or more advertisements may be advantageously provided by announcers with respective playing time slots, for example "18 h-22 h, from Monday to Friday", if there want to target specific customers, an advertisement being sent to the PABX 10 only during its playing time slot.

In a second step, performed for each incoming call received by the PABX 10 and placed on hold, a new playable waiting message is build.

To this end, the set A of advertisements is organized in a random order so as to allocate to each advertisement Ai a rank $R_{Ai}$ (see FIG. 4) in said order. In other words, the advertisements are reshuffled. The successive advertisements {Ai} are thus inserted respectively in the successive slots S1, S2, etc., of the template sequence message S, according to their rank $R_{Ai}$ in order. The completed template sequence message S* in which the advertisements A1, A2, etc. have been inserted can finally be played with an audio player software of the PABX 10 as long as the incoming call is on hold.

By performing such random reorganization of the set A of advertisements, their frequency of apparition is balanced thanks to the law of large numbers. Besides, the set A of advertisements may comprise several times the same advertisement, for example if an announcer wants to raise the frequency of apparition of an advertisement. Advantageously, for avoiding playing twice the same advertisement for the same user, the step of randomly reordering the set A of advertisements is performed so that two identical advertisements are separated by a minimum number of other advertisements, or are at least not directly following in order. A solution to this problem is for example to check after the reordering step whether there is at least one succession of two identical advertisements (or whether there are two identical advertisements which are too close), and performing again the step if so.

However, PABX are not always provided with functionalities enabling them to perform modifications of the template sequence message S.

In this case, the invention provides embodiments enabling to overcome this problem.

AoH Server

As represented by FIG. 1, the at least one PABX 10 may be completed by a local "music on hold" (MOH) server 11, this MOH server 11 acting as an "advertisement on hold" server. Indeed, as already explained, a MOH server 11 is an equipment able to deliver audio flows, and a PABX 10 is able to listen and play an audio flow.

A MOH server 11 may for example comprise in a server casing a processor, RAM memory, a storage hard drive, a plurality of Ethernet connectors, an operating system, a streaming media server software ("Icecast", for example), and advantageously a media streaming management software, and an encryption software.

Generally placed close to the PABX 10, the MOH server 11 acts as an interface between the advertisement management server 20 and the PABX 10. Thus, the MOH server 11 receives the template sequence message S and the set A of advertisements when sent by the advertisement management server 20, performs for each calling user the steps of building the completed sequence message S*, and provides with this completed template sequence message S* as an audio flux the PABX 10 for playing it.

Besides, a single MOH server 11 can supply a plurality of PABX 10 with advertising audio flows. Indeed, a call centre 1 often hosts more than one hotline. In the architecture represented by FIG. 3, a call centre 1 comprises a first PABX 10a and a second PABX 10b (It should be noted that a single physical PABX is sometimes able to manage more than one hotline, and thus to act as a plurality of PABX. In such a case each hotline is managed by a "virtual" PABX 10. So, PABX 10a and 10b of the example could be two virtual entities within a single PABX equipment). They are both connected to the telephonic network 30, and are used for two different hotlines: if a user calls for telephonic hotline of company α, its call will reach PABX 10a, and if he calls for telephonic hotline of company β, its call will reach PABX 10b. Both PABX are connected to the MOH server 11, which provides them with completed sequence message respectively S*a and S*b.

However, companies α and β may be very different companies, although they share the same set A of advertisements. For example, companies α and β may be respectively an internet provider and a car constructor: α will accept car advertisements but not β. So, a list L− of advertisements to not play is advantageously provided for at least one PABX 10, this list containing for example car advertisements for PABX 10b. Thus, only the advertisements of the set A which do not belong to said list L− being organized and inserted into the template sequence message S destined to this PABX 10 (See FIG. 5).

AoH Software

Figure 2:
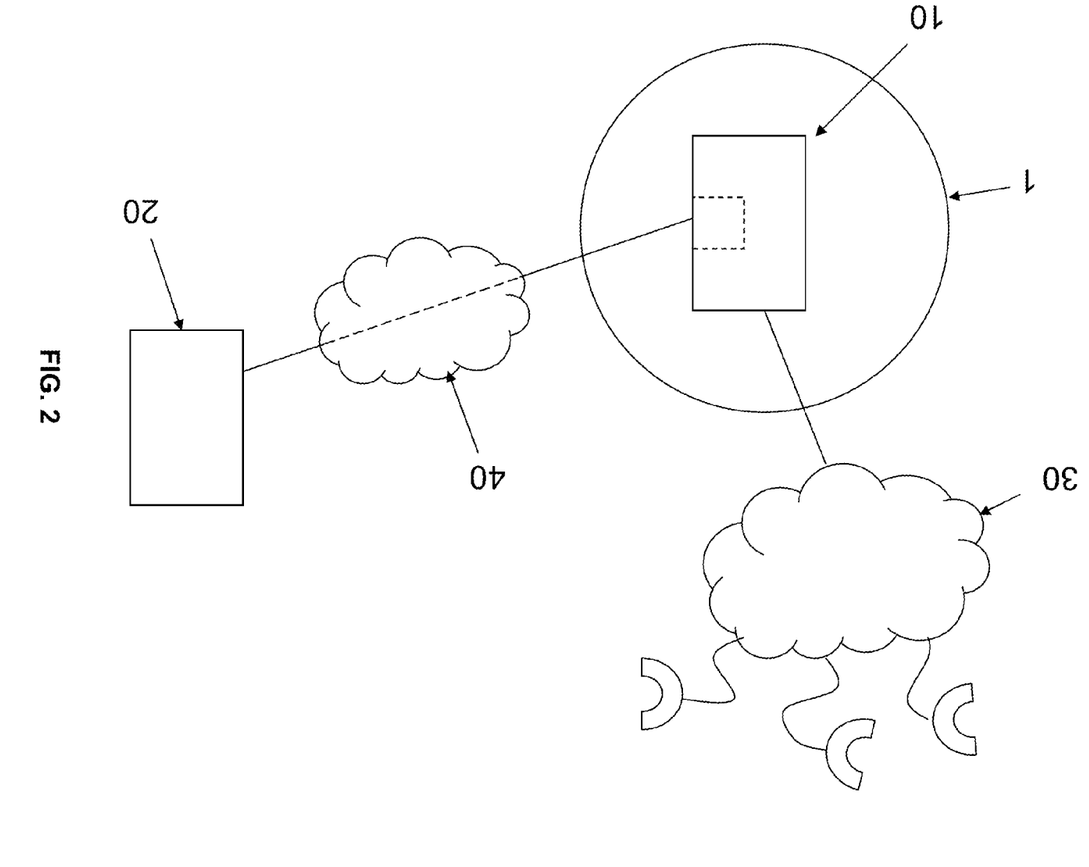
FIG. 2 represents a second embodiment of a call centre system according to an aspect of the invention.

Alternatively the PABX 10 is provided with an improved audio player software, and the advertisement management server 20 is directly linked with the PABX 10.

Thus, the possible missing functionalities of the PABX 10 are integrated in this improved audio player software. Thus, when improved, the audio player software becomes adapted to receive the template sequence message S and the set A of advertisements sent by the advertisement management server 20, then to perform the steps of building the completed sequence messages S*, and finally to directly play it. In such configuration, The PABX 10 is in direct interface the advertisement management server 20, and there is no more problems of advertisements sharing. Moreover, the cost of a MOH server is saved. However, modifications of an embedded software imply to conclude an agreement with the PABX's constructor.

Feedback

The on-hold duration cannot be predicted, and varies from one call to another. Only a variable part of the advertisements will thus be successfully and completely played. It should be interesting to monitor which advertisements are effectively played. Such a feedback is interesting both for the announcers and for the advertisement management server 20.

Figure 4:
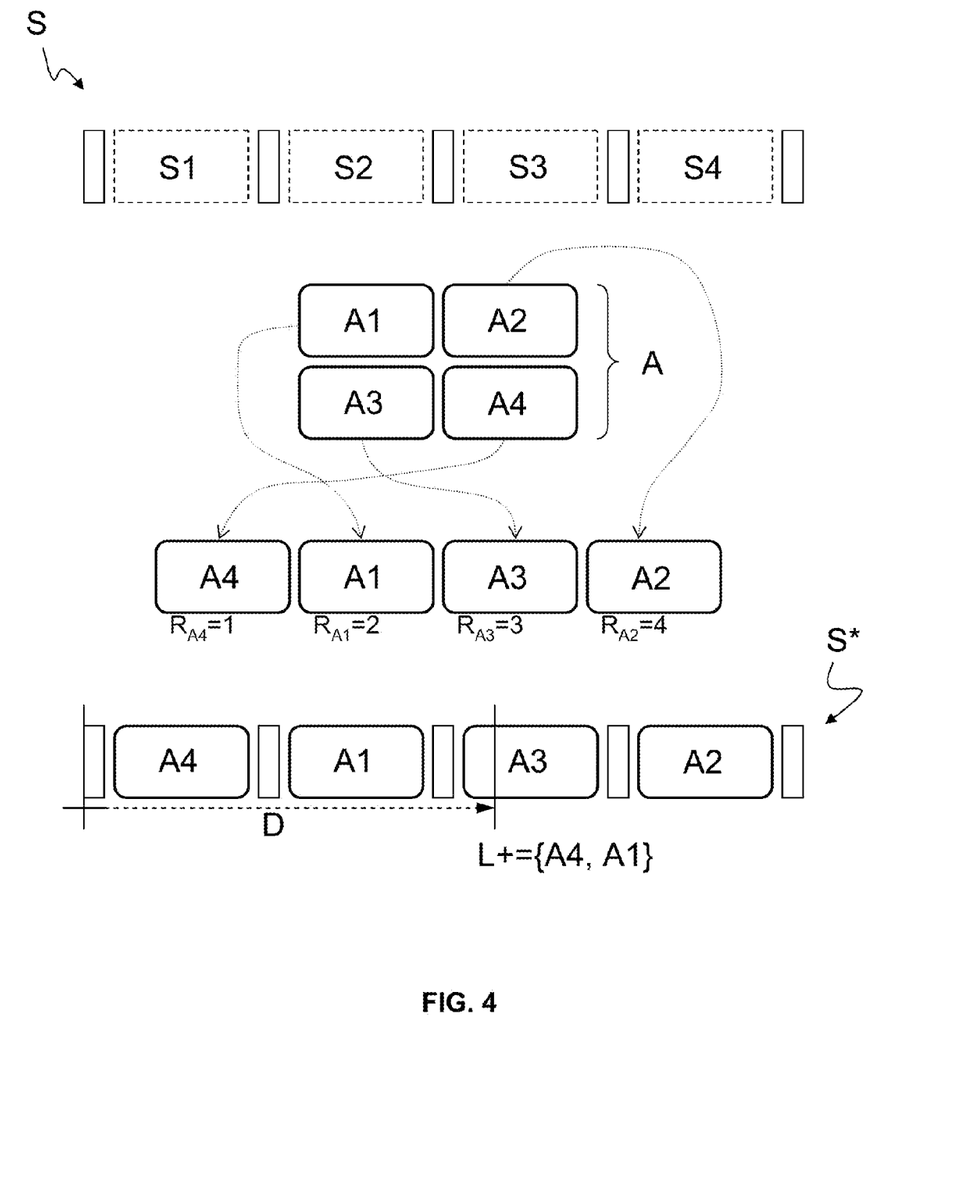
FIG. 4 represents steps of an embodiment of the method according to an aspect of the invention.

To this end, the method according to the invention may advantageously comprise a further step of sending back to the advertisement management server 20 a set of statistical data including a list L+ of advertisements completely played during the waiting time and/or a on hold duration value D (See FIG. 4).

If the template sequence message S was for example made for average on-hold duration of 5 minutes, and if feedback shows a real on-hold duration D of 3 minutes, then it is possible to configure the advertisement management server 20 so that it modifies automatically the display policy and thus the length of S to ensure a correct balance.

Besides, knowing each L+, it is possible to generate for example daily statistics on advertisements one by one. An announcer can thus know exactly how many times its advertisement has been fully played, and pay accordingly.

Interactive Advertisements

Audio advertisements are generally passive advertisements: the delivered audio message for example presents a new product, or incites the user to buy, etc. The user is not proposed to do any commercial action.

Advantageously, the set A of advertisements comprises at least one interactive advertisement, i.e. an active advertisement: as the user has in hand his phone, he may interact by pressing keys.

For example, the user may be told to press 1 if he wants to be called back by the company of the advertisement, or to press 2 if he wants to listen to a special offer, etc. In the case of his phone number being hidden, the user may be invited to dial his number if interested by further offers.

To enable this interactivity, a step of sending a notification to a remote server associated with the interactive advertisement is added if a given number is dialled by the user performing the incoming call when the interactive advertisement is played. The remote server may be a server of the company of the advertisement, the advertising management server 20, or any other equipment connected to the internet network 40. An URL of this remote server may be transferred to the MOH server 11 if any, the notification being first sent from the PABX 10 to the MOH server 11, and then sent to the remote server knowing its address.

The notification comprises advantageously the telephone number of the calling user, provided by the PABX 10 if not hidden, and else dialled by the user as already described.

Moreover, some hotlines owners dispose of files listing their users. For example, if the hotline owner is a telephone provider company, they are able to identify the calling user from its phone number. The interlocutor taking the call after the eventual waiting spot can thus have information about the calling user, and know before the beginning of the conversation for example which product he owns, why he called the last time, etc.

Figure 5:
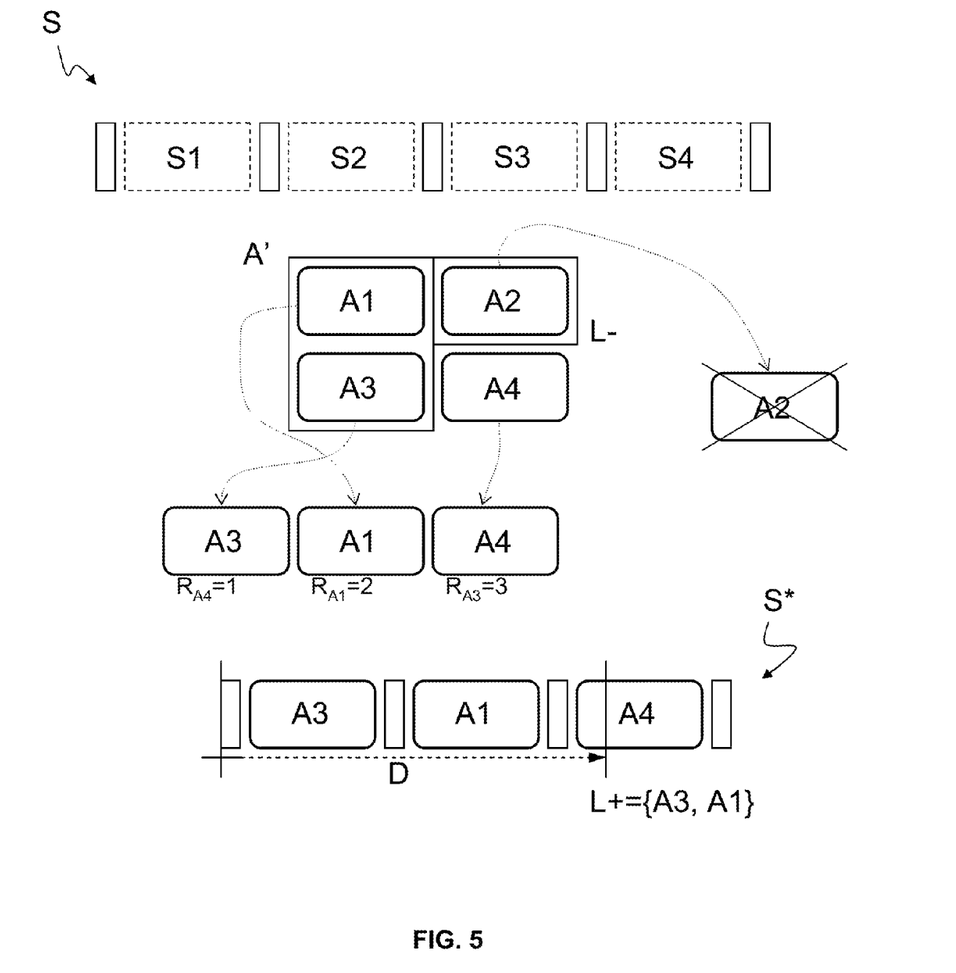
FIG. 5 represents steps of another embodiment of the method according to an aspect of the invention.

Advantageously, this information may enable to selected a subset A' of the set A before building the completed sequence message S*, the subset A' being adapted to the calling user. Indeed, videogames advertisements are for example more likely to interest a 20 years-old user than a 60 years-old user. The advertisements of the set A' may thus be weighted in the step of randomly reorganizing the advertisement before inserting them, in order to raise the probability that such advertisements to be played before the others, as represented by FIG. 5.

Call Centre

Figure 3:
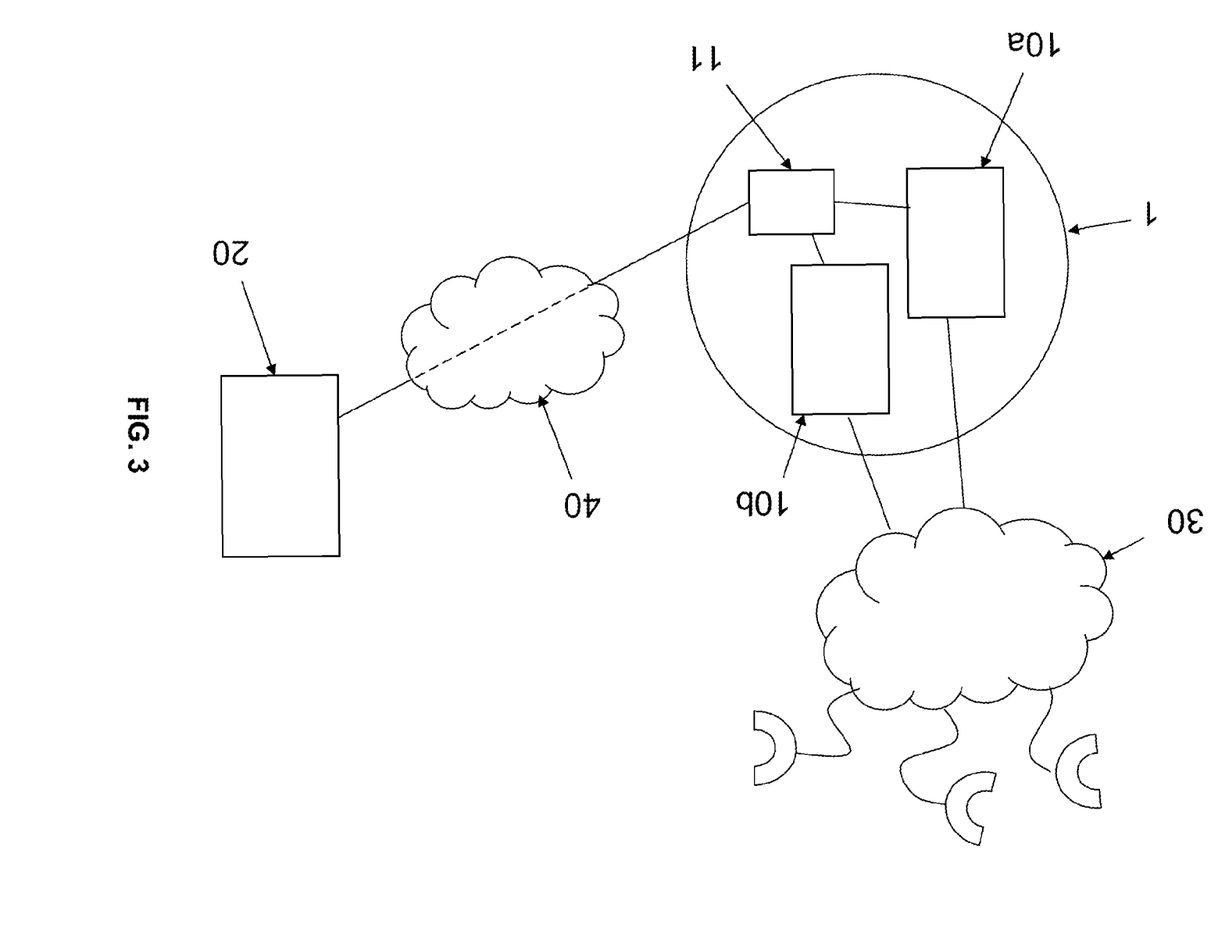
FIG. 3 represents a third embodiment of a call centre system according to an aspect of the invention.

According to a second aspect, the invention proposes a call centre system 1, as represented by any of FIGS. 1 to 3, comprising at least one PABX 10 connected to a telephonic network 30 and able to receive incoming calls from said telephonic network 30, the PABX 10 being connected to an advertisement management server 20, the call centre implementing a method according to the first aspect of the invention.

As already explained, a call centre 1 often comprise a plurality of PABX 10 and provides hotlines for a plurality of companies. Thanks to the invention, advertisements can be played as waiting message for a plurality of hotlines with only a few servers, advantageously a single advertising management server 20 and a single MOH server 11.

The invention claimed is:

1. A method for playing a sequence of advertisements as waiting message of an at least one private automatic branch exchange (PABX) (10),
    said PABX (10) being connected to a telephonic network (30) and being able to receive incoming calls from said telephonic network (30) and to put them on hold,
    the PABX (10) being connected to an advertisement management server (20),
        a set (A) of advertisements (A1, A2, . . . ) being stored into the advertisement management server (20),
        each advertisement (A1, A2, . . . ) being a recorded audio message,
characterized in that said method comprises the steps of:
    (a) creating a template sequence message (S) at the advertisement management server (20),
        said template sequence message (S) comprising a plurality of successive slots (S1, S2, . . . ),
        each slot (S1, S2, . . . ) being able to receive an advertisement (A1, A2, . . . );
    (b) sending the template sequence message (S) and the set (A) of advertisements (A1, A2, . . . ) to the PABX (10);
    (c) for each incoming call received by the PABX (10) and placed on hold by the PABX (10), performing the steps of:
        (c1) organizing the set (A) of advertisements (A1, A2, . . . ) in a random order so as to allocate to each advertisement (A1, A2, . . . ) a rank ($R_{A1}, R_{A2}, \ldots$) in said order;
        (c2) inserting the successive advertisements (A1, A2, . . . ) respectively in the successive slots (S1, S2, . . . ) of the template sequence message (S), according to their rank ($RA_{A1}, R_{A2}, \ldots$) in order;
        (c3) playing the completed template sequence message (S*) in which the advertisements (A1, A2, . . . ) have been inserted, with an audio player software of the PABX (10) server as long as the incoming call is on hold.

2. A method according to claim 1, wherein the at least one PABX (10) is completed by a local "music on hold" (MOH) server (11),
    the advertisement management server (20) being connected to the PABX (10) through said MOH server (11),
    the MOH server (11) being adapted to:
        receive the template sequence message (S) and the set (A) of advertisements (A1, A2, . . . ) at step (b),
        perform the steps (c1) and (c2), and
        provide with the completed template sequence message (S*) as an audio flux the PABX (10) for playing it at step (c3).

3. A method according to claim 1, wherein the at least one PABX (10) is provided with an improved audio player software, the improved audio player software being the audio player software adapted to:
    receive the template sequence message (S) and the set (A) of advertisements (A1, A2, . . . ) at step (b),
    perform the steps (c1) and (c2), and
    directly play the completed template sequence message (S*) at step (c3).

4. A method according to claim 1, wherein the set (A) of advertisements (A1, A2, . . . ) may comprises several times the same advertisement (A1, A2, . . . ), the organizing of step (c1) being performed so that two identical advertisements (A1, A2, . . . ) are not directly following in order.

5. A method according to claim 4, wherein the step (c1) consists in organizing the set (A) of advertisements (A1, A2, . . . ) in a random order so as to allocate to each advertisement a rank ($R_{A1}, R_{A2}, \ldots$) in said order, checking whether there is at least one succession of two identical advertisements (A1, A2, . . . ), and performing again the step if so.

6. A method according to claim 1, wherein a list (L−) of advertisements to not play is provided for the at least one PABX (10), only the advertisements (A1, A2, . . . ) of the set which do not belong to said list (L−) being used at step (c).

7. A method according to claim 1, wherein at least one advertisement (A1, A2, . . . ) is provided with a playing time slot, the advertisement (A1, A2, . . . ) being sent at step (b) only during its playing time slot.

8. A method according to claim 1, comprising a further step (c4) of sending back to the advertisement management server (20) a set of statistical data including a list (L+) of advertisements completely played during the step (c3) and/or a on hold duration value (D).

9. A method according to claim 1, wherein the set (A) of advertisements (A1, A2, . . . ) comprises at least one interactive advertisement, the step (c3) comprising a substep (c3') of sending a notification to a remote server associated with the interactive advertisement if a given number is dialled by the user performing the incoming call when the interactive advertisement is played.

10. A method according to claim 9, wherein the notification comprises the telephone number of the user performing the incoming call.

11. A method according to claim 1, wherein a subset (A') of the set (A) of advertisements (A1, A2, ... ) is selected before performing the step (c1), the subset (A') being adapted to the user performing the incoming call.

12. A call centre system (1), comprising at least one private automatic branch exchange (PABX) (10) connected to a telephonic network (30) and able to receive incoming calls from said telephonic network (30), the PABX (10) being connected to an advertisement management server (20), characterized in that it implements a method according to claim 1.

* * * * *